No. 12,448. REISSUED FEB. 6, 1906.

J. C. MILLER.

APPARATUS FOR STERILIZING LIQUIDS.

APPLICATION FILED JULY 17, 1903.

2 SHEETS—SHEET 1.

Witnesses

E. G. Alexander

H. C. Meyner

Inventor

John C. Miller,

By A. H. Bliss

Attorney

No. 12,448. REISSUED FEB. 6, 1906.

J. C. MILLER.

APPARATUS FOR STERILIZING LIQUIDS.

APPLICATION FILED JULY 17, 1903.

2 SHEETS—SHEET 2.

Witnesses.
E. P. Alexander
A. E. Meynes.

Inventor
John C. Miller
By H. H. Bliss
Attorney

UNITED STATES PATENT OFFICE.

JOHN C. MILLER, OF CANTON, OHIO, ASSIGNOR, BY MESNE ASSIGNMENTS, TO THE MILLER PASTEURIZING MACHINE CO., OF CANTON, OHIO, A CORPORATION OF NEW JERSEY.

APPARATUS FOR STERILIZING LIQUIDS.

No. 12,448. Specification of Reissued Letters Patent. Reissued Feb. 6, 1906.

Original No. 678,892, dated July 23, 1901. Application for reissue filed July 17, 1903. Serial No. 166,065.

*To all whom it may concern:*

Be it known that I, JOHN C. MILLER, a citizen of the United States, residing at Canton, in the county of Stark and State of Ohio, have invented certain new and useful Improvements in Apparatus for Sterilizing Liquids; and I do declare the following to be a full, clear, and exact description of the invention, such as will enable others skilled in the art to which it appertains to make and use the same.

This invention relates to a new and improved apparatus for heating and cooling liquids, and more particularly to an apparatus for treating milk to destroy bacteria and germs and to remove therefrom obnoxious odors and taste, all of which may be accomplished without imparting to the milk a cooked taste, which is generally noticeable in milk treated by other processes and means, and, furthermore, without destroying the cream-giving properties of the milk, whereby the cream may be skimmed from the milk treated by my process the same as if the sterilization had not taken place.

This invention consists, broadly, in the construction and arrangement of an apparatus for suddenly and uniformly raising the temperature of the milk to be treated to a point below the boiling-point of water—say, for instance, to 168° or 170° Fahrenheit—keeping the milk in constant motion and in an attenuated stream or film while it is being subjected to this high temperature and then immediately directing the milk from the heater to a cooler, where the said heat is suddenly and continuously without pause removed from it and its temperature reduced to the desired degree. Before entering the cooler it is preferably exposed to the air to liberate from it all obnoxious fumes and gases.

The invention also consists in certain other steps, which will be hereinafter described and claimed.

Figure 1:
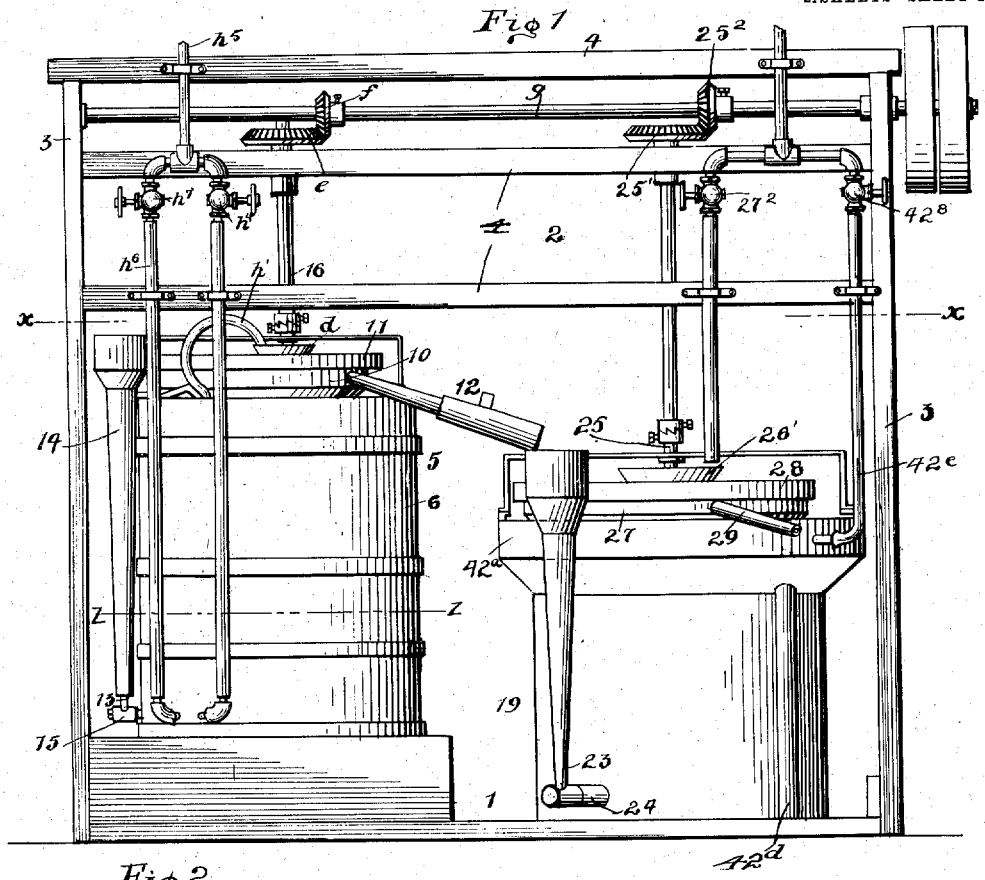
Figure 2:
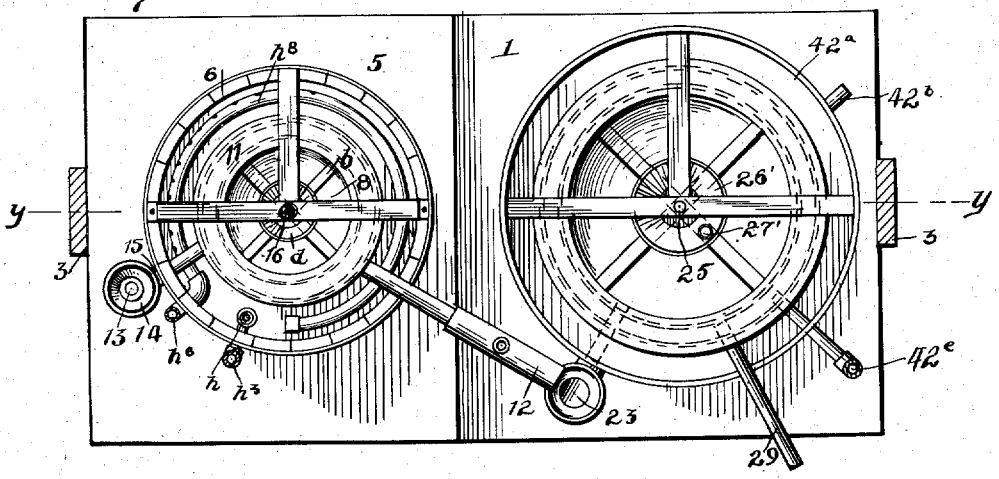
Figure 3:
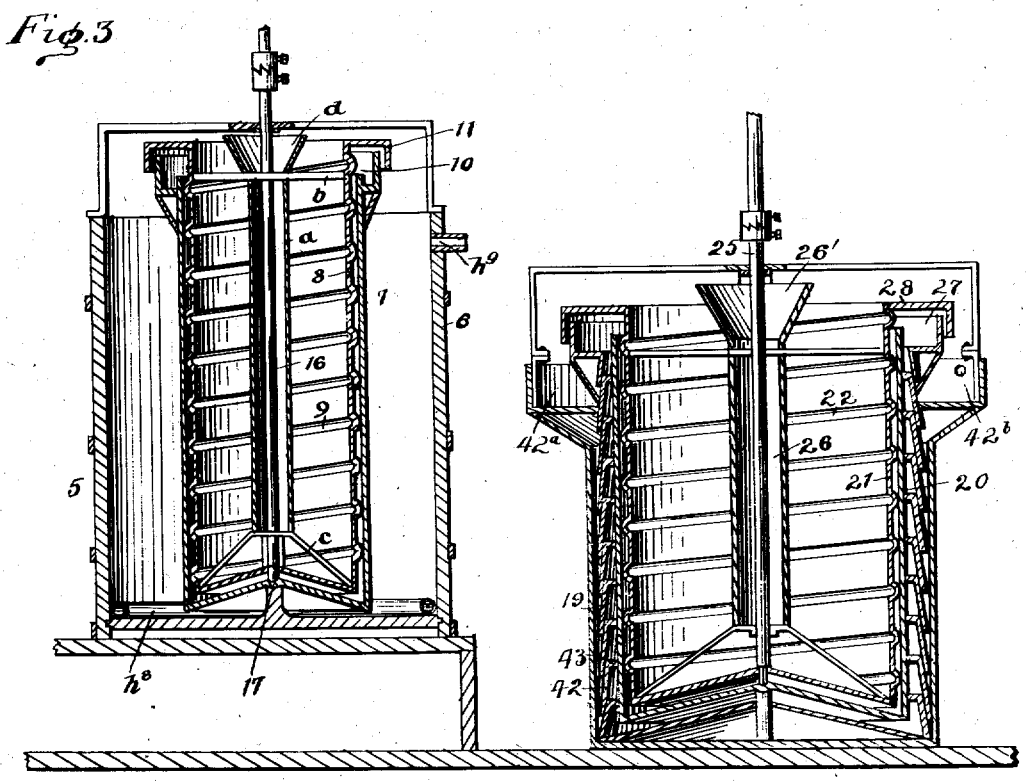
Figure 4:
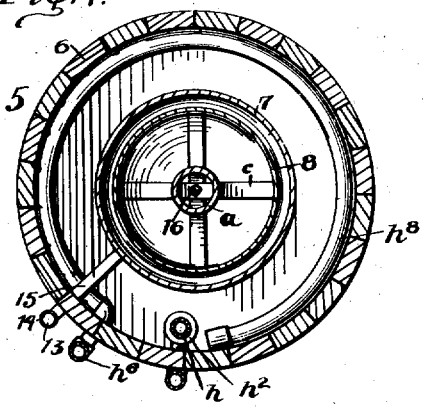
Figure 5:
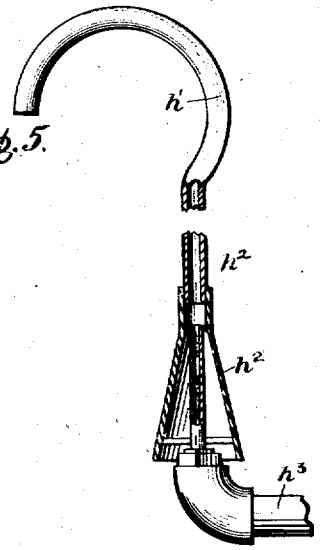

In the accompanying drawings, Figure 1 is a side elevation of an apparatus for carrying out my improved process. Fig. 2 is a transverse horizontal section on the line *x x* of Fig. 1. Fig. 3 is a longitudinal vertical sectional view on the line *y y* of Fig. 2. Fig. 4 is a horizontal sectional view on the line *z z* of Fig. 1; and Fig. 5 is a side elevation, partly in section, of the steam or hot-water injector.

Referring to said drawings, 1 denotes the supporting-bed, and 2 the gear-frame, the latter consisting of vertical standards 3, connected by cross-bars 4.

5 denotes the heater, which consists of the tub 6, which incloses two cylinders 7 and 8, the latter being inclosed within the former and formed with a helical corrugation 9, which throughout its entire length engages the inner wall of the cylinder 7 and forms a feed-screw. The upper end of the cylinder 7 is formed with an annular trough 10, while the upper end of the cylinder 8 is provided with an overhanging flange or shield 11, which prevents the liquid fed upward by the corrugation 9 being thrown out of the trough and also prevents the steam or hot water becoming mixed with the said liquid. 12 denotes a pipe or conveyer which leads from said trough and communicates with the cooler hereinafter described.

13 denotes a supply-pipe, the upper end of which is provided with a funnel 14, into which the liquid is adapted to be fed, and the lower end of which communicates with a transverse pipe 15, which communicates with the bottom of the cylinder 7 and is adapted to supply the liquid to said cylinder below the bottom of the cylinder 8.

*a* denotes a vertical tube arranged centrally within the cylinder 8 and secured thereto by braces *b* and *c*. Each end of this tube is open, and the upper end is provided with a funnel *d*.

16 denotes a shaft fixed in the bottom of the cylinder 8 and having its lower end stepped in a bearing 17, formed in the bottom of the cylinder 7. This shaft is adapted to be rotated in any suitable manner, preferably by providing it with a gear *e*, which meshes with a gear *f*, fixed to the drive-shaft *g*, and will impart a rotary movement to the cylinder 8 to feed the liquid in the bottom of the cylinder 7 upward into the trough 10. Steam or hot water is adapted to be injected into the cylinder 8 to raise the temperature of the liquid as it is being fed upward in an attenuated stream from the bottom of the cylinder 7 and between the cylinders 7 and 8 by the helical rib or feed-screw, whereby the liquid under treatment will be thoroughly heated.

To maintain an equal temperature around the outside of the cylinder 7 and the inside of the cylinder 8, and thereby subject all particles of the liquid to a uniform temperature, I provide an injector $h$, which I locate between the tub 6 and the outer cylinder 7. This injector consists of a tube $h'$, the upper end of which is bent over the funnel $d$ to direct the steam and hot water into said funnel. The lower end of the tube is flared, as shown at $h^2$, and projecting within this flared end is a steam or hot-water pipe $h^3$, controlled by a cock $h^4$ and connected at its upper end to the main steam-pipe $h^5$. A second steam-pipe $h^6$, provided with a controlling-cock $h^7$, projects through the tub 6 and is connected with a perforated coil $h^8$, which is arranged within the tub at the bottom thereof.

When the machine is in operation, the hot water is fed into the tub and entirely surrounds the cylinder 7. The cock $h^4$ is now opened and the injector put into action. The hot water is now drawn from the tub by the injector and fed into the funnel $d$ and passing down the centrally-disposed vertical pipe is discharged into the cylinder 8 at the bottom thereof. It will thus be seen that the cylinders 7 and 8 will be kept at the same temperature, so that the milk being fed between said cylinders will have a uniform temperature. If desired, the tub may be provided with an overflow-pipe $h^9$.

After the liquid has been thoroughly heated it is desirable to cool the same or reduce it to a low temperature, by doing which it is found that the cooked taste so objectionable in sterilized liquids is entirely removed, and the sudden subjection of the liquid to a low temperature completes the destroying of the germs, bacteria, and spores which may be in the liquid. It is desirable in transferring the liquid from the heater to the cooler to pass it through the air or vent it, so as to permit of the escape of obnoxious fumes and gases. The manner of accomplishing this will soon appear from the following description:

The cooler hereinbefore referred to consists of a tub or casing 19 and the cylinders 20 and 21. Within the tub or casing 19 and within the cylinder 21 is adapted to be placed a cooling agent, such as cold water, or, if desired, I may use cold water in the tub and cold water and ice in the cylinder 21. The inner cylinder 21 is provided with a helical corrugated feed-screw 22, which coacts with the interior wall of the cylinder 20 to feed the liquid under treatment upwardly in a like manner as in the description of the heater.

The conductor-pipe 12 extends from the trough of the heater to a feed-pipe 23, which communicates with a pipe 24, which leads to the space between the cylinders 20 and 21 and conveys the liquid from the heater to the said space. As the liquid is discharged from the pipe 12 into the pipe 23 it is subjected to the atmosphere and the gases and fumes separated from said liquid by the action of the heater are liberated, so that the liquid when admitted to the cooler is free from such fumes and gases and is in condition to have any bacteria or germs therein destroyed by the shock incident to the sudden changing of the temperature of the liquid. The cylinder 21 is provided with a shaft 25 for rotating it, and this shaft is provided with a gear-wheel 25′, meshing with a gear $25^2$, fixed to the drive-shaft. The cylinder is also provided with a centrally-disposed tube 26 open at each end and having at its upper end a funnel 26′. Through this funnel is adapted to be passed cold water from a pipe 27′, provided with a stop-cock $27^2$. The upper end of the cylinder 20 is provided with a trough 27, while the upper end of the cylinder 21 is provided with an overhanging flange or shield 28.

29 denotes a discharge-pipe leading from the trough 27 to a point where the liquid is to be bottled or stored.

The cylinder 20 of the cooler is preferably provided with a spiral strip 42, having a continuous flange 43 to form a spiral chamber and is provided at its upper end with a trough $42^a$, having an outlet-pipe $42^b$ near its upper edge and may be inclosed within the casing 19. The tub at the lower end communicates with a vertically-disposed external pipe $42^d$, which leads upwardly and communicates with the trough $42^a$.

A cold-water pipe $42^e$, provided with a stop-cock $42^8$, extends through the trough $42^a$ and communicates with the upper end of the tub. The ice, if used as a cooling agent, is placed within the cylinder 21 and the water turned on and discharged from its respective pipes 27′ and $42^e$. The water discharging from the former pipe enters the plane of the vertically-disposed tube and is discharged at the bottom of the inner cylinder and flows upward over the flange or shield 28 and empties into the trough $42^a$ and escapes through the escape-pipe $42^b$. The water entering the outer cylinder passes in a tortuous stream around the same until it reaches the lower end of the cylinder, from whence it escapes into the vertical pipe $42^d$ and is led to the trough $42^a$ and discharged therefrom through the escape-pipe $42^b$.

From the foregoing description, taken in connection with the drawings, it is believed that the apparatus will be fully understood without requiring an extended explanation. It may be well to lay stress upon the fact that the process carried out by this apparatus is a continuous one and that there are no periods of rest, thereby enabling me to operate the machine without waste of time, which is common to machines used for similar purposes, wherein the liquid under treatment has been raised to a certain temperature it is held at that temperature for a certain period before it is passed to the cooler, thus necessitating a halt in the process, and consequently reducing the capacity of the machine. By my apparatus the liquid under treatment is fed to the heater in a continuous stream and flows from the cooler in a like manner thoroughly sterilized.

It will be noticed that I herein refer to the apparatus at 5 (comprising a number of parts) as a "heater," and mean to be understood as referring to and including apparatus capable of accomplishing the first step in pasteurization, which, as is well known, requires a relatively low temperature (such as that hereinbefore referred to) in comparison with the relatively high temperature that is required when the entire work of sterilizing is to be accomplished in the heating apparatus. As I understand it one part of the total operation of destroying bacteria, spores, &c., is (where relatively low heating, such as I herein mention, is employed) dependent upon the sudden and continuous cooling of the liquid at as early an instant as possible after the heating of it. This immediate, sudden, and continuous cooling not only removes the heat from the milk, so that it cannot injuriously affect the cream-raising qualities thereof, but brings the temperature of the milk down to a point below the growing-point of the deleterious bacterial organisms or spores and prevents the multiplication of those spores and highly resistant forms of bacteria which may have escaped the influence of the heater—that is to say, according to my present understanding the two parts of the apparatus shown, the heater and the cooler, coact as a sterilizer or pasteurizer.

With an apparatus constructed substantially as is that shown and described there are formed two hollow annular or cylindrical films of milk, one at the place of heating and one at the place of cooling, the milk passing immediately from the place where the heating-film is formed to that where the cooling-film is formed, and it will be seen that the milk constituting these films passes upward in each case and that there is a maintenance of a hydrostatic pressure in each of the two parts of the apparatus. The film-like character of the upward-rising column results from the exceeding closeness of the inner cylinder 8 in the heating apparatus to the outer cylinder 7, they being only a small fraction of an inch apart. As there is relative motion of the surfaces which form one the inner side wall and the other the outer side wall of the passage-way for the milk-film, the surfaces themselves act to prevent the formation of any filaments or particles of coagulation which may tend to form, particularly where there is surface present upon which they can commence to collect. Bringing these two surfaces close together (the distance between them in even the largest sizes of apparatus being from one-sixteenth to one-eighth of an inch) insures, first, that the milk considered as a mass shall be quickly heated as it rises upward; secondly, that it shall be uniformly heated, because each milk particle from the first instant to the last instant of the travel through the film-passage is practically in contact with one or the other of the thin metallic walls 7 and 8, and therefore the particles become evenly heated, and, third, that the coagulating of the milk or the collecting of it as a coat upon either of the walls is prevented, for the rotation of the wall keeps up such a motion among the particles (though not an agitating motion) as to prevent the collection of coats or filaments. The screw device 9 assists in performing these functions, but is not absolutely essential therefor. The closeness of the thin straight metallic walls, as will be readily seen, results in a species of horizontal helical movement being imparted to the milk particles as they travel upward, thus elongating their path.

Prior to my invention many different styles of apparatus have been devised both for heating and for cooling milk; but I believe that I am the first to discover a heat-governed process for pasteurizing or sterilizing milk without injuring its cream-giving qualities and to invent a complete continuous apparatus for carrying out this process in which all of the elements are so correlated that all of the particles of milk to be treated are first suddenly and uniformly raised in temperature to the degree required to kill germs or bacteria of certain deleterious species and then immediately upon the particles being sufficiently heated they are subjected to a cooling action which suddenly and continuously without pause removes all of the heat from them which would tend to injuriously affect the cream-giving qualities of the milk, and the temperature of all the particles of milk is further reduced to the point at which the multiplication of such spores or bacteria as may have escaped destruction by the heat is prevented. During both the sudden and uniform raising of the temperature of all of the milk particles and the sudden and continuous cooling thereof I have found it highly desirable to cause them to travel in a relatively thin attenuated stream or film, and in the raising of their temperature in order to insure the uniformity of temperature of all of the particles I have found it desirable to apply heat uniformly to both sides of said relatively thin attenuated stream or film from the moment the particles enter the region of heat application until they are delivered therefrom. I have found it especially desirable to remove the heat from the milk as rapidly, suddenly, and thoroughly as possible, or, in other words, as nearly instantaneously as possible. In the cooler herein described I avoid the exposure to the air during the cooling stage, and thus avoid reinfecting the milk with the bacteria or the spores with which the open air is well known to be charged. I effect a quick, thorough, and uniform cooling by passing it upward in an annular or cylindrical film, as above described, this being greatly superior to the cooling of the hot body of liquid while remaining in bulk or by allowing it to pass through cooling-chambers whose walls are so arranged as to permit it to flow therethrough under the action of gravity in voluminous currents or streams of large cross-dimensions.

Having thus described my invention, what I claim, and desire to secure by Letters Patent of the United States, is—

1. In an apparatus of the character described, the combination with a heater comprising a tub, two cylinders placed within the tub one within the other, one of said cylinders being provided with a feed-screw which works against the other cylinder, of a steam or hot-water pipe located within the tub exterior to the cylinders, and an injector located in the tub to eject the water therefrom and inject it into the innermost cylinder whereby a uniform temperature is maintained between the two cylinders, substantially as set forth.

2. In an apparatus of the character described, the combination with a heater comprising a tub and two cylinders placed within the tub one within the other, one of said cylinders being provided with a feed-screw which works against the other cylinder, of a steam or hot-water pipe located within the tub exterior to the cylinders, and an injector located within the tub to eject the water therefrom and inject it into the innermost cylinder whereby a uniform temperature is maintained between the two cylinders, substantially as set forth.

3. In an apparatus of the character described, the combination with a heater comprising a tub and two cylinders placed within the tub one within the other, of a steam or hot-water-discharge pipe located in the bottom of the tub exterior to the cylinders, and an injector leading from the tub to the innermost cylinder, substantially as set forth.

4. In an apparatus of the character described, the combination with a heater comprising a tub and two cylinders placed within the tub one within the other, of a steam or hot-water coil located in the bottom of the tub exterior to the cylinders, a vertical pipe extending downwardly and in close proximity to the bottom of the innermost cylinder, and an injector leading from the tub and adapted to discharge into the vertically-disposed pipe within the cylinder, substantially as set forth.

5. The combination of a cooler comprising an inner and outer cylinder, the inner cylinder being provided with a feed-screw to engage the inner wall of the outer cylinder, the outer cylinder being provided with an external tortuous water-passage and with an upper trough which communicates with the space formed between the two cylinders, and the inner cylinder being provided with a lateral flange or guard extending over said trough, a second trough arranged around the outer cylinder and extending laterally beyond the first-named trough and adapted to receive the overflow from the inner cylinder, a water-pipe communicating with the inner cylinder and the tortuous passage of the outer cylinder, a pipe communicating with the lower end of the tortuous passage and the last-named trough, substantially as set forth.

6. In a mechanism for treating milk and other liquids, the combination of an outer water-holding vessel having a thin wall on the outer side of a milk-passage, a duct leading milk to the bottom of the said milk-passage, a trough or receptacle for the milk at the upper end of the said passage, an inner rotary vessel adapted to hold a body of water and having a thin wall forming the inner side of the milk-passage, and a shield carried by the said inner vessel and extending outward over the said milk-trough and turned down to leave its outer edge in vertical lines which are outside of the vertical lines of the milk-trough and adapted to direct the overflow from the inner water-holding vessel into the outer one, substantially as set forth.

7. In an apparatus for treating milk, the combination of an inner water-holding vessel, a second vessel, the adjacent walls of said vessels forming a relatively thin passage-way for the milk between them, and the said inner vessel being adapted to hold a body of water normally cut off from the outer vessel, means for rotating one of said vessels relatively to the other one, an outer water-holding vessel arranged to hold a body of water around said second vessel, a water-heater in one of said water-holding vessels adapted to heat the water therein approximately to a predetermined temperature, and a water-heater adapted to continuously supply heated water to the second water-holding vessel of substantially the same temperature as that of the heated water in the first water-holding vessel.

8. In an apparatus for treating milk, the combination of an inner water-holding vessel and an outer water-holding vessel with their adjacent walls arranged to form a relatively thin passage-way for the milk between them, the inner water-holding vessel being adapted to hold a body of water normally cut off from the said body of water in the said outer water-holding vessel, a water-heater in one of said vessels adapted to raise the temperature of the water therein to the desired degree, a water-heater for the other vessel adapted to continuously deliver heated water to it from the first vessel, and means for rotating one of said vessels relatively to the other one.

9. In an apparatus for treating milk, the combination of an inner water-holding vessel, an outer water-holding vessel, the inner wall of the latter and the outer wall of the former being arranged to provide a relatively thin passage-way for the milk between them, the said inner water-holding vessel being adapted to hold a body of water normally cut off from the body of water in the outer water-holding vessel, means for continuously supplying water to the inner water-holding vessel near the bottom thereof, means for continuously supplying water to the outer water-holding vessel, means for feeding the milk to the bottom of said milk passage-way, means for collecting the milk at the top of said milk passage-way, and means for rotating one of said water-holding vessels relatively to the other one, substantially as set forth.

10. In an apparatus for pasteurizing or sterilizing milk without injuring its cream-giving qualities, the combination of means for causing the milk to be treated to travel in a relatively attenuated stream or film, means for suddenly and uniformly heating all of the particles of said milk while it is so traveling, means for causing said milk after it has been heated to flow in a second relatively attenuated stream or film, means for immediately directing the said heated milk from the delivery-point of the said first stream or film to the receiving-point of the said second stream or film, and means for suddenly and continuously without pause removing the heat from the milk while it is traveling in said second stream or film.

11. In an apparatus for treating milk to pasteurize or sterilize it without injuring its cream-giving qualities, the combination of two closely-adjacent heat-conducting walls arranged to form a relatively thin passage-way for the milk between them, means for substantially uniformly heating said walls to the same desired degree, means for introducing the milk to be treated between said walls, means for causing it to flow rapidly therebetween to the point of its delivery from said passage-way, whereby all of the milk particles are suddenly and uniformly heated, a cooler having a heat-conducting surface, means for immediately directing the uniformly-heated milk from the delivery-point of said heated-milk passage-way to the said heat-conducting surface of the cooler, means for causing the milk to travel along said cooling-surface in a relatively attenuated stream or film, and means for maintaining the said cooling-surface at the necessary degree of temperature to suddenly and continuously without pause remove the said heat from all of the particles of the milk and to reduce the temperature of the milk to the desired degree.

12. In an apparatus for treating milk to pasteurize or sterilize it without injuring its cream-giving qualities, the combination of two closely-adjacent heat-conducting walls arranged to form a relatively thin passage-way for the milk between them, means for substantially uniformly heating said walls to the same desired degree, means for introducing the milk to be treated between said walls, means for causing it to flow rapidly therebetween in a circuitous path to the point of its delivery from said passage-way, whereby all of the milk particles are suddenly and uniformly heated, a cooler having a heat-conducting surface, means for immediately directing the uniformly-heated milk from the delivery-point of said milk passage-way to the said heat-conducting surface of the cooler, means for causing the milk to travel along said cooling-surface in a relatively attenuated stream or film, and means for maintaining the said cooling-surface at the necessary degree of temperature to suddenly and continuously without pause remove the said heat from all of the particles of the milk and to reduce the temperature of the milk to the desired degree.

13. In an apparatus for pasteurizing or sterilizing milk without injuring its cream-giving qualities, the combination of a pair of heat-conducting walls arranged to form a relatively thin passage-way for the milk to be treated between them, means for substantially uniformly heating the said walls to the same desired degree, means for introducing the milk to be treated between said walls, means for causing the milk to flow rapidly therebetween to the point of its delivery from said passage-way whereby all of the particles are suddenly and uniformly heated, a second pair of heat-conducting walls arranged to form a second relatively thin passage-way for the milk between them, means for cooling each of said last-described walls to the desired temperature, means for conducting the heated milk from the said first milk passage-way immediately to the receiving-point of the second milk passage-way, and means for causing the milk to flow rapidly and continuously through the said second passage-way, whereby the heat is suddenly and continuously removed from all of its particles.

14. In an apparatus for pasteurizing or sterilizing milk without injuring its cream-giving qualities, the combination of a pair of heat-conducting walls arranged to form a relatively thin passage-way for the milk to be treated between them, means for substantially uniformly heating the said walls to the same desired degree, means for introducing the milk to be treated between the said walls, means for causing the particles of milk to flow rapidly in a circuitous path therebetween to the point of their delivery from said passage-way whereby all of its particles are suddenly and uniformly heated, a second pair of heat-conducting walls arranged to form a second relatively thin passage-way for the milk between them, means for cooling each of said last-described walls to the desired temperature, means for conducting the heated milk from the said first milk passage-way immediately to the receiving-point of the said second milk passage - way, and means for causing the milk to flow rapidly in a circuitous path and continuously through the said second passage-way whereby the heat is suddenly and continuously without pause removed from all of said particles.

15. In an apparatus for pasteurizing or sterilizing milk without injuring its cream-giving qualities, the combination of an inner water-holding cylinder, an outer cylinder, the adjacent walls of said cylinders forming a relatively thin passage-way for the milk between them, means for holding a body of water around said outer cylinder, means for rotating one of said cylinders relative to the other one, means for maintaining the water around the walls of said milk passage-way heated to substantially the same temperature, means for supplying milk from a relatively high level to the bottom of said milk passage-way, means for collecting it at the top thereof, a second pair of concentric cylinders having their adjacent walls arranged to form a relatively thin passage-way for the milk between them, said passage-way being arranged at a lower level than the level of the first - described milk passage-way, means for rotating one of said last-described cylinder-walls relative to the other one, means for supplying cooling medium of the desired temperature to each of said walls, and means for immediately directing the heated milk collected at the top of the first-described milk passage-way to the bottom of said cooling passage-way.

In testimony whereof I affix my signature in the presence of two witnesses.

JOHN C. MILLER.

Witnesses:
HOMER GIESSEN,
WM. J. PIERO.